US005813633A

United States Patent [19]
Anzel

[11] Patent Number: 5,813,633
[45] Date of Patent: *Sep. 29, 1998

[54] METHOD AND APPARATUS FOR STATIONKEEPING A SATELLITE OFFSET BY PITCH ROTATION

[75] Inventor: Bernard M. Anzel, El Segundo, Calif.

[73] Assignee: Hughes Electronics Corporation, Los Angeles, Calif.

[*] Notice: The term of this patent shall not extend beyond the expiration date of Pat. No. 5,443,231.

[21] Appl. No.: 577,573

[22] Filed: Dec. 22, 1995

[51] Int. Cl.⁶ ..................................................... B64G 1/26
[52] U.S. Cl. ............................................................ 244/169
[58] Field of Search ................................... 244/164, 169, 244/172, 170; 701/13

[56] References Cited

U.S. PATENT DOCUMENTS 5,020,746  6/1991  Anzel .
5,443,231  8/1995  Anzel .

OTHER PUBLICATIONS

Anzel, Bernard M., "Controlling a Stationary Orbit Using Electric Propulsion," DGLR/AIAA/JSASS 20th International Electric Propulsion Conference, W. Germany, Oct. 3–6, 1988, pp. 1–9.

*Primary Examiner*—Galen L. Barefoot
*Attorney, Agent, or Firm*—Terje Gudmestad; M. W. Sales

[57] ABSTRACT

A method of stationkeeping for a three-axis stabilized satellite having four thrusters mounted in a generally rectangular configuration on an anti-nadir face of the satellite, each of the four thrusters having a line of thrust which passes through the center of mass of the satellite, the four thrusters including a northwest thruster, a northeast thruster, a southwest thruster, and a southeast thruster. The method includes the step of rotating the satellite about a pitch axis that is perpendicular to a normal to the anti-nadir face of the satellite. The northwest thruster and the northeast thruster are canted away from the anti-nadir face in a north direction with respect to a north-south axis which passes through the center of mass of the satellite. The southwest thruster and the southeast thruster are canted away from the anti-nadir face in a south direction with respect to the north-south axis. The northeast thruster and the southeast thruster are slewed in an east direction about the north-south axis and the northwest thruster and the southwest thruster are slewed in an west direction about the north-south axis. Next, the northeast thruster and the northwest thruster are fired near an orbit ascending node and the southeast thruster and the southwest thruster are fired near an orbit descending node, wherein each of the four thrusters is fired in accordance with the amount that the satellite is rotated about the pitch axis.

26 Claims, 4 Drawing Sheets

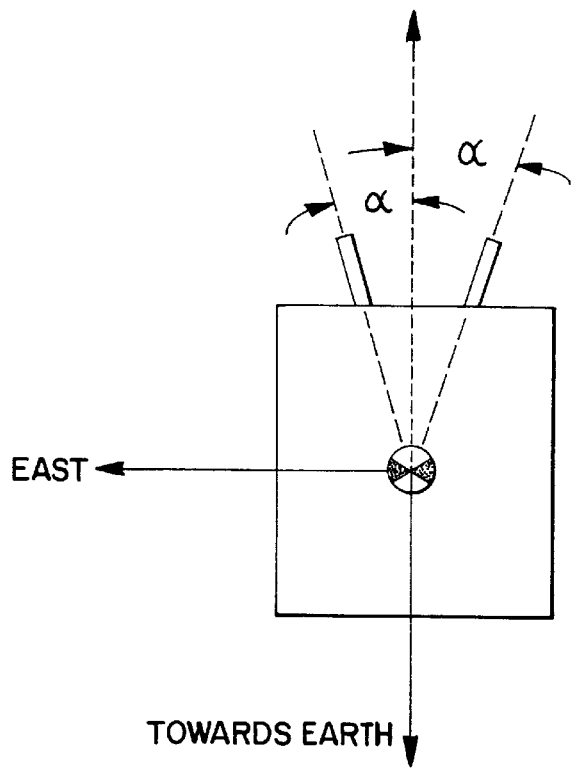
FIG. IA
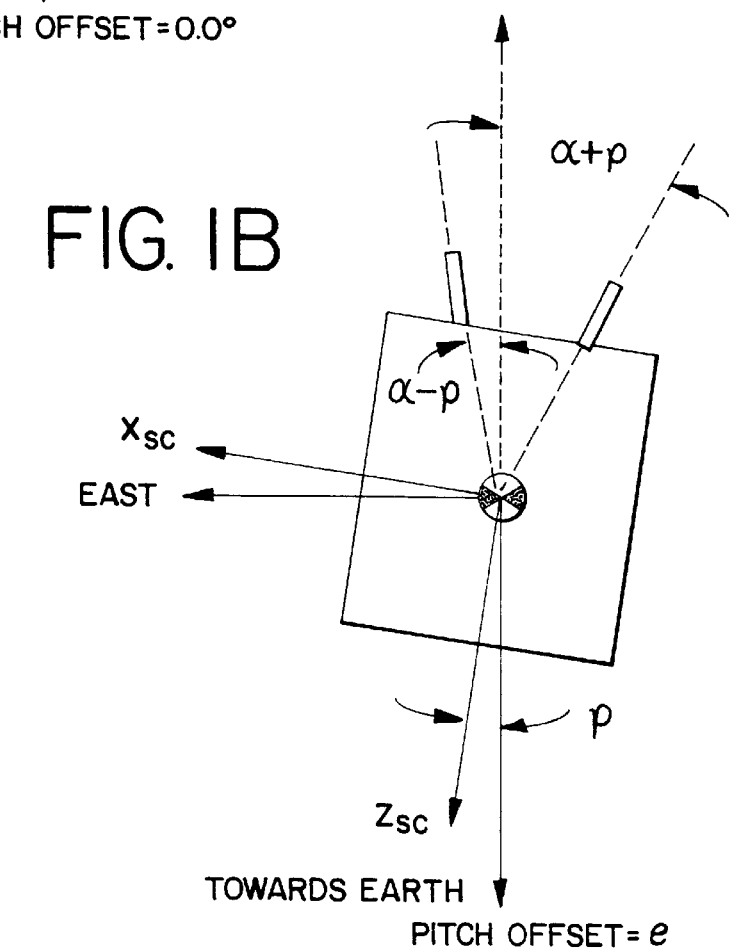
FIG. IB

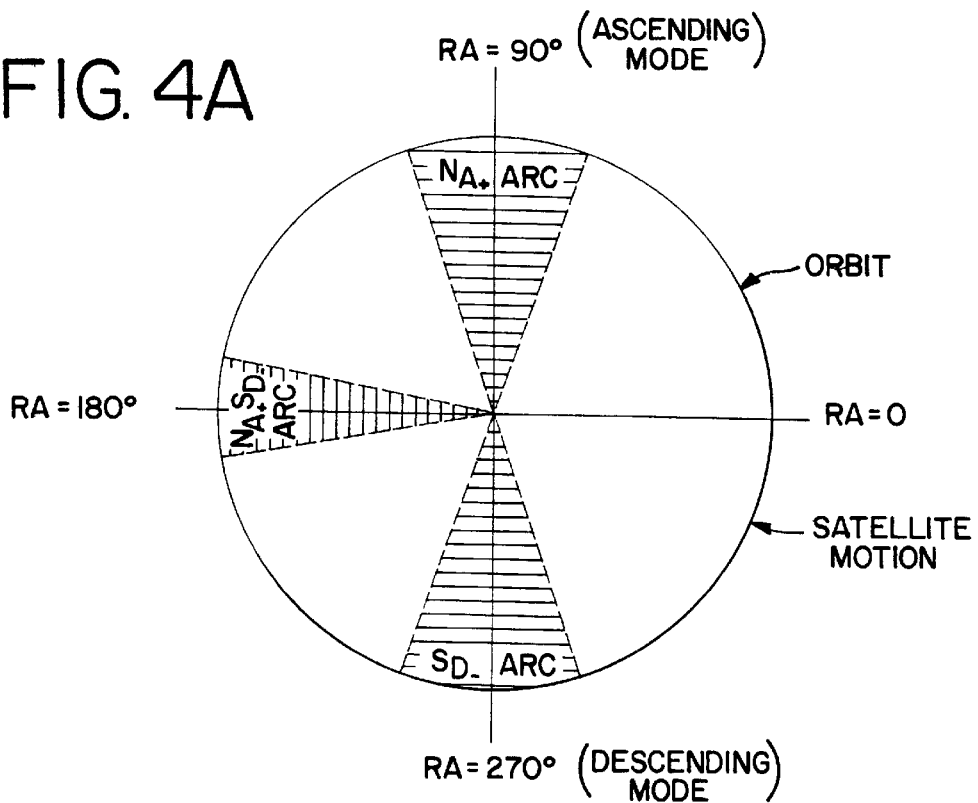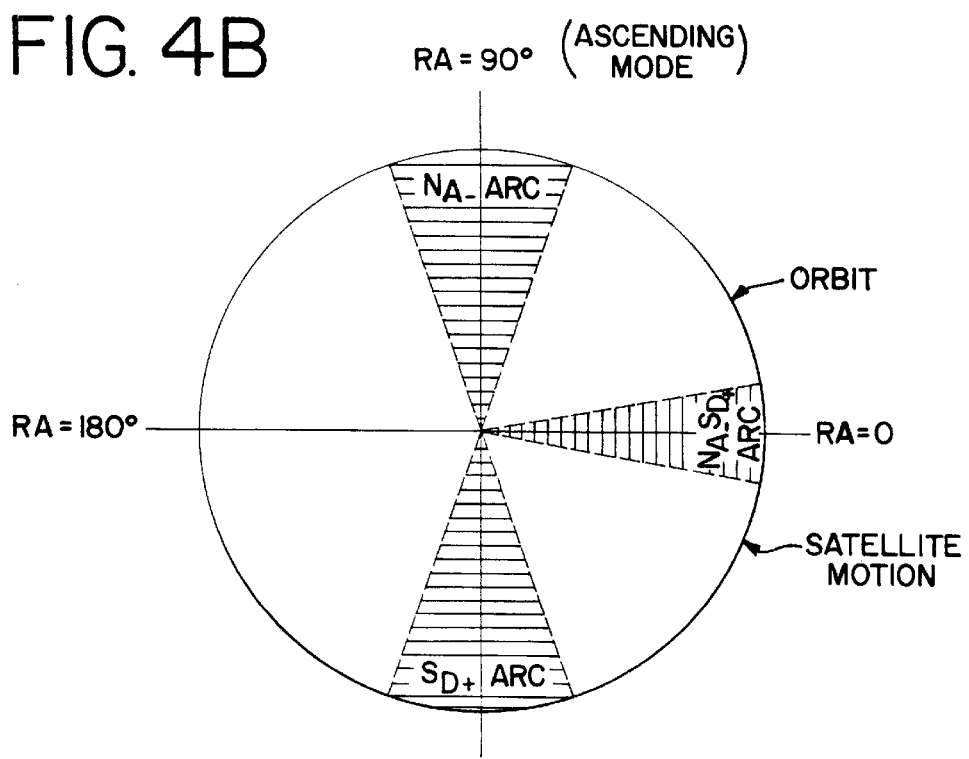

METHOD AND APPARATUS FOR STATIONKEEPING A SATELLITE OFFSET BY PITCH ROTATION

BACKGROUND OF THE INVENTION

1. Technical Field

This invention relates to satellite stationkeeping and, more particularly, to a method and apparatus for maintaining the satellite in a stationary orbit through the simultaneous control of tangential, radial and normal acceleration components of thrust when the satellite has been rotated about its pitch axis.

2. Background Art

Synchronous satellites orbit the Earth with the same revolution rate as that of the Earth. Accordingly, the satellite constantly appears above a fixed point on the Earth. Hence, synchronous satellites are often referred to as geostationary satellites and operate within a stationary orbit. Synchronous satellites are useful for many applications, including communication applications.

It is generally well known in the art that various forces act on synchronous satellites to move the satellite out of stationary orbit. These forces are due to several sources including the gravitational effects of the sun and moon, the elliptical shape of the Earth and solar radiation pressure. To counter these forces, synchronous satellites are equipped with propulsion systems that are fired at intervals in order to maintain station in a desired orbit. This requires control of the inclination, eccentricity and mean motion of the satellite. Inclination is the north-south position of the satellite relative to the Earth's equator. Eccentricity is the measure of the non-circularity of the satellite orbit. That is, the measure of the variation of the distance the satellite is from the Earth as the Earth and satellite rotate. Finally, mean motion is the average position of the satellite in an east-west direction relative to a sub-satellite point on the Earth. For a more detailed discussion see Controlling a Stationary Orbit Using Electric Propulsion by Bernard M. Anzel, presented to the 1988 International Electric Propulsion Conference in West Germany.

Stationkeeping was first achieved with a spin-stabilized communication satellite launched in 1964. Current satellites are either spin-stabilized or three-axis stabilized satellites. Spin-stabilized satellites use the gyroscopic effect of the spinning satellite to help maintain the satellite orbit. For certain applications, the size of the satellite militates in favor of a three-axis stabilization scheme.

One example of a three-axis stabilization satellite is described in U.S. Pat. No. 5,443,231 to Anzel ("the '231 Anzel patent"), whose entire contents are incorporated herein by reference. The '231 Anzel patent describes a satellite with four thrusters mounted in a rectangular pattern on the anti-nadir side of the three-axis satellite. As shown in FIGS. 1A and 3, the Anzel satellite defines X, Y and Z body axes aligned with the orbital axes—east, south and nadir axes, respectively. The slew angles of the $N_{A+}$ (northwest) and $N_{A-}$ (northeast) thrusters, and the $S_{D+}$ (southwest) and $S_{D-}$ (southeast) thrusters are equal. Aligning the Z-axis with the nadir axis is the classical geosynchronous satellite scenario where the satellite is constantly pointed at a point directly below it on the Earth. This is advantageous for communication satellites and the like which send a customized signal designed to be sent to particular places on the Earth. In this case, the Anzel patent discloses a firing scheme for the four thrusters to be performed during each orbit.

In some cases, it is desired to rotate a three axis satellite, such as described in the '231 Anzel patent, about its Y-axis (pitch axis) in order to point the beam of the antenna of the satellite to an area on the Earth which is different than the area covered by the unpitched signal. As shown in FIG. 1B, the slew angles of the $N_{A+}$ and the $S_{D+}$ thrusters will both either increase or decrease. Likewise, the slew angles of the $N_{A-}$ and $S_{D-}$ thrusters will decrease or increase. However, the loss of effective slew angle can be limiting if the perturbing drift acceleration is large and has a sign such that the thrusters with reduced effective slew angles are required to provide increased tangential $\Delta V$. This becomes most acute at that time of year when maximum tangential $\Delta V$ from one of these same thrusters is required by virtue of the phase of the effect of solar force on orbit eccentricity.

SUMMARY OF THE INVENTION

The present invention provides a method of controlling the motion of a three-axis spacecraft that has been rotated about a pitch axis. The method of the present invention controls the motion of the satellite in the presence of pitch rotation in an efficient manner.

The present invention pertains to a method of stationkeeping for a three-axis stabilized satellite having four thrusters mounted in a generally rectangular configuration on an anti-nadir face of the satellite, each of the four thrusters having a line of thrust which passes through the center of mass of the satellite, the four thrusters including a northwest thruster, a northeast thruster, a southwest thruster, and a southeast thruster. The method includes the steps of: rotating the satellite about a pitch axis that is perpendicular to a normal to the anti-nadir face of the satellite. The northwest thruster and the northeast thruster are canted away from the anti-nadir face in a north direction with respect to a north-south axis which passes through the center of mass of the satellite. The southwest thruster and the southeast thruster are canted away from the anti-nadir face in a south direction with respect to the north-south axis. The northeast thruster and the southeast thruster are slewed in an east direction about the north-south axis and the northwest thruster and the southwest thruster are slewed in an west direction about the north-south axis. Next, the northeast thruster and the northwest thruster are fired near an orbit ascending node and the southeast thruster and the southwest thruster are fired near the orbit descending node, wherein each of the four thrusters is fired in accordance with the amount that the satellite is rotated about the pitch axis.

Another aspect of the present invention involves a stationkeeping system for a three-axis stabilized satellite having four thrusters mounted in a generally rectangular configuration on an anti-nadir face of the satellite, each of the four thrusters having a line of thrust which passes through the center of mass of the satellite, the four thrusters including a northwest thruster, a northeast thruster, a southwest thruster, and a southeast thruster. The northwest thruster and the northeast thruster are canted away from the anti-nadir face in a north direction with respect to a north-south axis which passes through the center of mass of the satellite, and the southwest thruster and the southeast thruster are canted away from the anti-nadir face in a south direction with respect to the north-south axis. Furthermore, the northeast thruster and the southeast thruster are slewed in an east direction about the north-south axis, and the northwest thruster and the southwest thruster are slewed in a west direction about the north-south axis. A control element is connected to each of the four thrusters, which monitors the pitch angle and generates control signals that (1) fire the northeast thruster and the northwest thruster near an orbit ascending node, and (2) fire the southeast thruster and the southwest thruster near an orbit descending node, each of the four thrusters being fired in accordance with the pitch angle of the satellite.

A third aspect of the present invention is a method of stationkeeping for a three-axis stabilized satellite in response to a failure of a first thruster of four thrusters, the four thrusters mounted in a generally rectangular configuration on an anti-nadir face of the satellite, each of the four thrusters having a line of thrust which passes through the center of mass of the satellite and is canted away from the anti-nadir face, the four thrusters including a north pair and a south pair. The method includes the step of monitoring the amount that the satellite is rotated with respect to a pitch axis that is perpendicular to a normal to said anti-nadir face of the satellite. The method further includes shutting down a second thruster of the four thrusters where the second thruster is located diagonally with respect to the first thruster. The remaining north thruster of the north pair is fired near an orbit ascending node and the remaining south thruster of the south pair is fired near the orbit descending node. The remaining north thruster and the remaining south thruster are simultaneously fired between the orbit ascending node and the orbit descending node, wherein the remaining north thruster and the remaining south thruster are simultaneously fired to control an orbit eccentricity component without substantially affecting a tangential velocity component. Furthermore, the velocity produced by each thruster and the duration of each firing is dependent on the monitored amount that the satellite is rotated with respect to the pitch axis.

The above-described aspects of the present invention provide an efficient system for controlling the orbital motion of a three axes spacecraft in the presence of rotation about a pitch axis. The disclosed system also provides a method of backing up a thruster should it fail when the satellite is rotated about a pitch axis.

The foregoing features and advantages of the present invention will be further understood upon consideration of the following detailed description of the invention taken in conjunction with the accompanying drawings, in which:

BRIEF DESCRIPTION OF THE DRAWINGS

FIG. 1A shows a top schematic view of a three-axis satellite employing the four thruster system of the '231 Anzel patent;

FIG. 1B shows a top schematic view of a three-axis satellite employing a four thruster system according to the present invention;

FIGS. 4A and 4B depict the burn arcs using each of the diagonal pairs of the thrusters to achieve satellite stationkeeping in the event of a failure of one of the thrusters in the four thruster system according to the present invention;

DESCRIPTION OF THE PREFERRED EMBODIMENT

Figure 2:
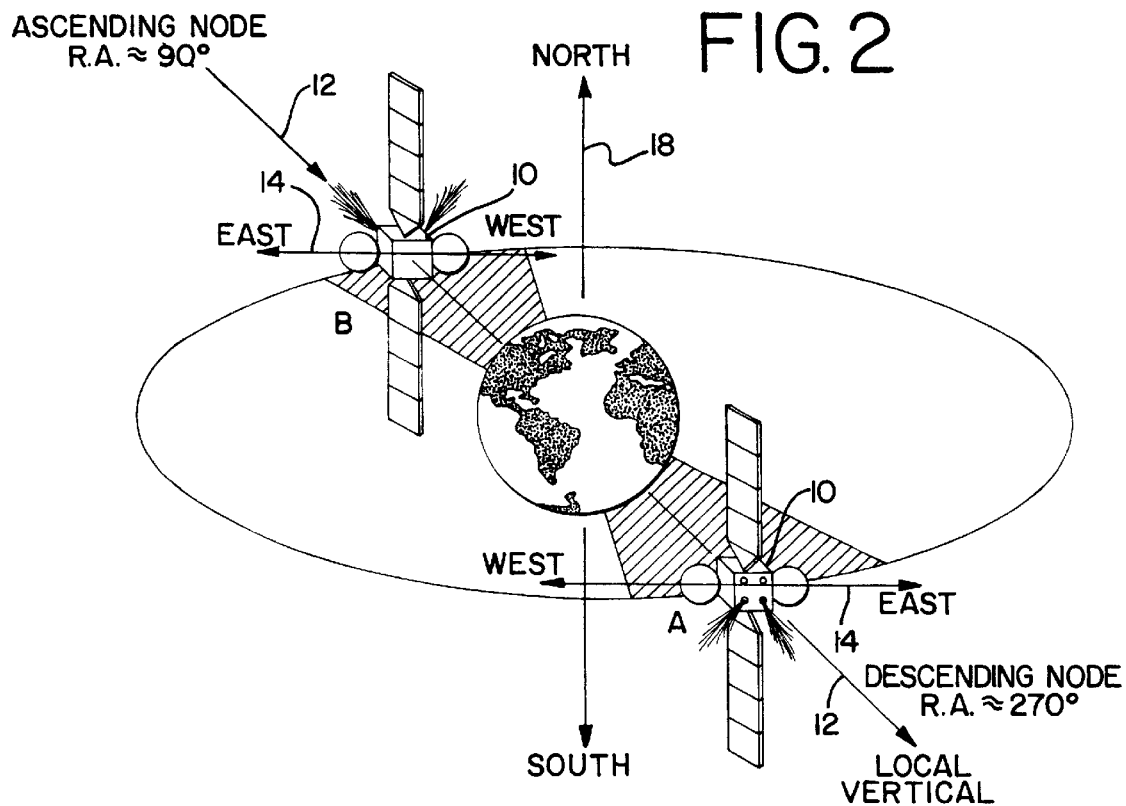
FIG. 2 shows a three-axis stabilized satellite in a stationary orbit about the Earth in two different positions to illustrate the improved method of satellite stationkeeping according to the present invention.

Referring now to the drawings and initially to FIG. 2, a three-axis stabilized satellite 10 is shown in a stationary orbit about the Earth. A set of local coordinates for the satellite 10 is defined by the local vertical 12, by an east-west axis 14 and a north-south axis 16. The origin of the coordinates is the center of mass (C.M) of the satellite 10. The local vertical 12, as shown in FIG. 2, is the line through the Earth and satellite 10 which represents the nadir and anti-nadir directions. The nadir direction is the direction toward the Earth, and the anti-nadir direction is the direction away from the Earth. FIG. 2 shows the satellite 10 in a first position A and a second position B to illustrate the location where the thruster firings take place. The cross-hatching in FIG. 2 is intending to indicate the burn arc of the thrusters.

Figure 3:
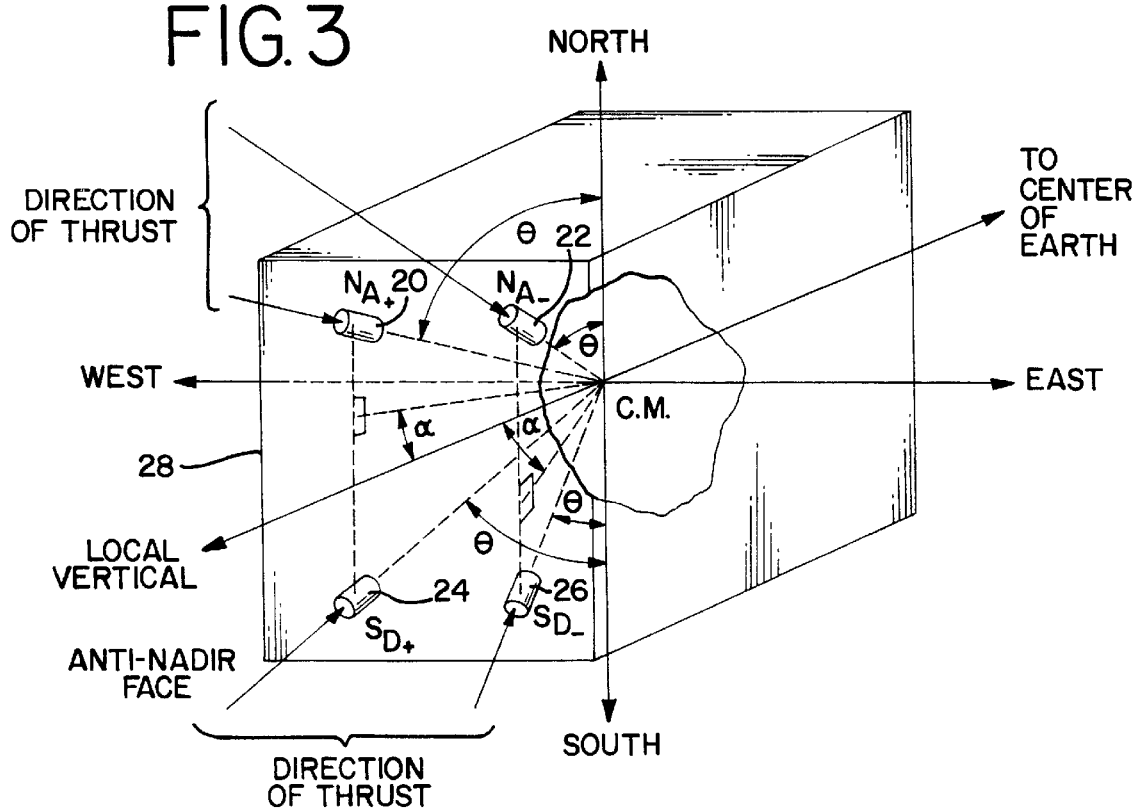
FIG. 3 shows a simplified 3-dimensional view of a three-axis satellite employing the four thruster system of the present invention.

FIG. 3 shows the thruster configuration of the '231 Anzel patent where the four thrusters 20, 22, 24, and 26 are mounted on the anti-nadir face 28 of the satellite 10. The four thrusters are canted away from the anti-nadir face by an angle θ so that the thrust lines pass through the satellite center of mass. The north thruster pair 20, 22 are preferably mounted as close to the north end of the face 28 as is structurally possible. Likewise, the south thruster pair 24, 26 are mounted as close to the south end of the face 28 as is structurally possible. This mounting will minimize the cant angles of each pair and therefore minimize the cosine loss. The cosine loss is a geometric inefficiency in that for each unit of ΔV which a thruster produced, a smaller amount (equal to the cosine of the cant angle) appears in the north-south direction.

The thrust lines of the north thrusters 20 and 22 and the south thrusters 24 and 26 make the angle θ, ranging from approximately 45° to 55°, with the Y-axis 16. In addition to the cant angle θ away from the anti-nadir face, the thrusters are also laterally separated and slewed by an angle α about the Y-axis 16. The slew angle must be large enough to effectively control the orbit eccentricity. The slew angles are determined from the tangential ΔV requirements imposed by the maximum solar force to satellite mass ratio to be encountered during on-station life. This then determines the horizontal separation for both the north and south thruster pairs along the anti-nadir face. A slew angle of approximately 10°–15° is appropriate. Due to small changes in the center of mass of the satellite over time and the requirement for simultaneous momentum dumping, both the effective slew angle α and the effective cant angle θ will vary. This angle modification may be accomplished by a conventional gimbal and servo mechanism not shown. The four thrusters 20–26 provide complete control of the three orbit vectors, namely, inclination, eccentricity and mean motion. Each thruster produces three components of ΔV, i.e. normal, tangential and radial (toward the Earth), since their lines of thrust are directed through the satellite center of mass.

As described in the '231 Anzel patent, when the Z-axis is aligned with the nadir axis, the optimum thrusts, thrust durations and thrust firing positions can be calculated for a given slew angle α and cant angle θ. When the spacecraft has been rotated about the Y-axis, the calculation of the optimum firing parameters can be calculated in a similar manner.

FIG. 1B demonstrates the case where the unpitched satellite 10 of FIGS. 1A and 3 is rotated by a pitch angle, ρ. The rotation changes the effective slew angles and cant angles of the thrusters when compared with their unpitched slew and cant angles α and θ, respectively. The effective slew angle, $\alpha_1$, of the western thrusters $N_{A+}$ and $S_{D+}$ is given by $\alpha_1 = \alpha + \rho$. Similarly, the slew angle $\alpha_2$, of the eastern thrusters $N_{A-}$ and the $S_{D-}$ is given by $\alpha_2 = \alpha - \rho$. It follows that the effective cant angles, $\theta_1$, $\theta_2$, for the western and eastern thrusters, respectively, are determined from the equations:

$$\tan\theta_1 = \tan\theta'\cos(\alpha + \rho) \text{ and}$$

$$\tan\theta_2 = \tan\theta'\cos(\alpha - \rho) \text{ where } \tan\theta' + \frac{\tan\theta}{\cos\alpha}.$$

As with the thruster configuration of the '231 Anzel patent, the optimum time in the present invention for providing north-south corrections to maintain the required inclination is at a right ascension (R.A.) of approximately 90° for negative acceleration (south correction) and approximately 270° for positive acceleration (north correction). (Right ascension is the angle measured in the equatorial plane from a reference position of the sun at vernal equinox to the satellite position). This is because most changes in inclination are produced by forces acting along an R.A. of approximately 90°. In accordance with the present invention, the north thrusters 20 and 22 provide negative acceleration and are fired at R.A.≈90° while the south thrusters 24 and 26 provide positive acceleration and are fired at R.A.≈270°. If, as shown in FIG. 2, the firing arcs are equal, each pair of thrusters will provide one-half the required north-south velocity increment. Those skilled in the art will recognize that the frequency with which the thrusters are fired may vary without departing from the scope of the present invention.

Figure 7:
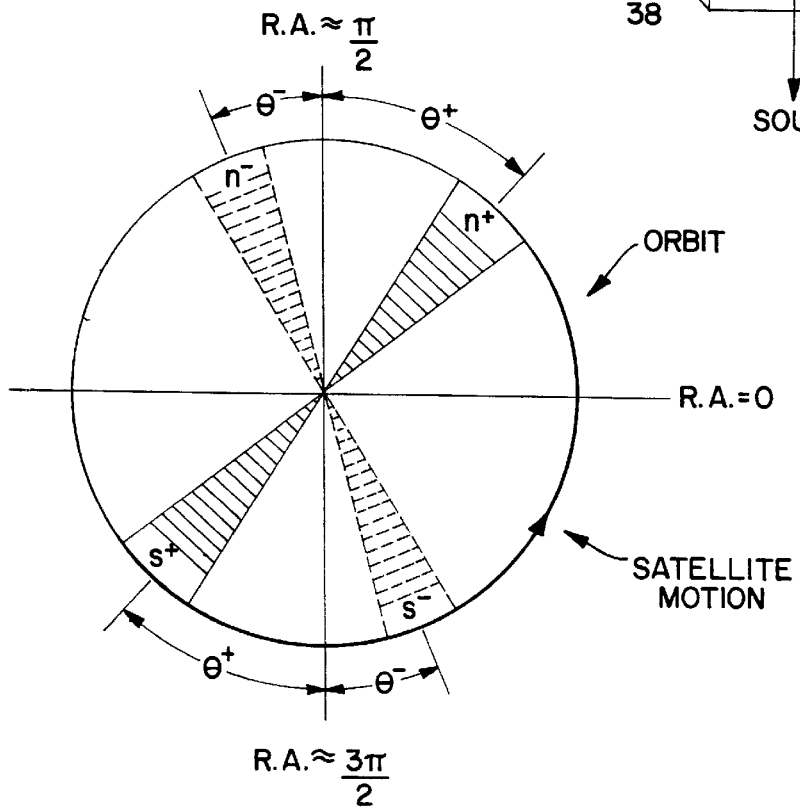
FIG. 7 shows a four thruster firing scheme according to the present invention.

Both north thrusters 20, 22 are fired within ±10° of the orbit ascending node (R.A.≈90°), and both south thrusters 24, 26 are fired within ±10° of the orbit descending node (R.A.≈270°). Note that the ±10° range is due to the 18.6 year cycle due to the lunar gravitational perturbation. To accomplish momentum dumping, the north firings should not occur simultaneously nor should the south firing occur simultaneously. For example, as shown in FIG. 7, the northwest thruster 20 may be fired before the ascending node (θ+) and the northeast thruster 22 fired after the ascending node (θ−) and a similar sequence would be followed for the south pair of thrusters at the descending node. Note that depending on both orbit and momentum dumping considerations, either the θ+ or θ− angles will be determined as an independent variable. The other angle is derived from the constraint that the total change in inclination after the four firings will be along an axis connecting R.A.≈π/2 and R.A.≈3π/2. In any event, these firings produce additive changes in inclination in a direction opposite to the effect of the sun/moon gravity perturbation. If the ΔV's produced by the firing of the north pair and south pair of thrusters are equal, the radial components are equal, resulting in no set change in the orbit eccentricity. However, the radial ΔV components (always toward the Earth's center) produce generally unwanted additive eastward shifts in the mean longitude.

The north thrusters 20 and 22 produce positive and negative tangential components of ΔV, respectively. A net tangential ΔV which can be either positive or negative is, therefore, available. This positive or negative net tangential ΔV is likewise available when firing the south thrusters 24 and 26. This versatility permits complete control of the vector eccentricity component along a coordinate axis defined by the line connecting the R.A.≈π/2 and R.A.≈3π/2. The tangential ΔV also provides simultaneously, the correction in mean motion necessary to counter the triaxiality perturbation, as well as the aforementioned eastward motion of the mean longitude arising from the radial ΔV components.

The inclination vector is completely controlled by the sum of the north-south ΔV components produced by the firings of the north and south pairs of thrusters. However, the firings need not be equal; in fact, by making them deliberately unequal, the difference in their radial components can be used to control the vector eccentricity component along a coordinate axis orthogonal to that connecting R.A.≈π/2 and R.A.≈π/2.

Thus, the ΔV components required for each of the four thrusters will, in general, be unequal and vary with the perturbations; the thruster ΔV components controlling four orbit parameters, inclination, mean motion and two orthogonal eccentricity components. The two orthogonal eccentricity components produce the necessary vector eccentricity change to counter the effects of the solar radiation perturbations.

For typical angles, e.g., θ=52°, α=13°, ρ=3°, the effective cant angles are calculated to be: $\theta_1$=51.62°; $\theta_2$=52.30°. As can be seen, the effective cant angles are barely affected by pitching the satellite 10. Accordingly, if it assumed that the cant angle is unaffected by the pitch of the satellite 10, approximations for the normal components $\Delta V_N$ of ΔV for the firing of the four thrusters can be calculated in a manner similar to that disclosed in the '231 Anzel patent. In particular, the ΔV components developed by the four thrusters 20 ($N_{A+}$), 22 ($N_{A-}$), 24 ($S_{D+}$), 26 ($S_{D-}$) are shown in the chart below:

| Thruster | ΔV COMPONENTS | | |
|---|---|---|---|
| | $\Delta V_N$ (Normal) | $\Delta V_T$ (Tangential) | $\Delta N_R$ (Radial) |
| $N_{A+}$ | South | East | Nadir |
| $N_{A-}$ | South | West | Nadir |
| $S_{D+}$ | North | East | Nadir |
| $S_{D-}$ | North | West | Nadir |

$\Delta V_R$ and $\Delta V_T$ are related to $\Delta V_N$ through the cant and slew angles θ and α, respectively, $\Delta V_R = \Delta V_N \tan\theta$; $\Delta V_T = \Delta V_N \tan\theta \tan\alpha$.

The four values of $\Delta V_N$ for the $N_{A+}$, $N_{A-}$, $S_{D+}$ and $S_{D-}$ thrusters, respectively, are:

$$\Delta V_N(N_{A+}) = \left[\frac{1}{2(\tan\alpha_1 + \tan\alpha_2)}\right]\left[\frac{\Delta V_{DT} + \Delta V_{ET}}{\tan\theta} + \tan\alpha_2\left(\Delta V_{IN} - \frac{\Delta V_{ER}}{\tan\theta}\right)\right]$$

$$\Delta V_N(N_{A-}) = \left[\frac{1}{2(\tan\alpha_1 + \tan\alpha_2)}\right]\left[-\left(\frac{\Delta V_{DT} + \Delta V_{ET}}{\tan\theta}\right) + \tan\alpha_1\left(\Delta V_{IN} - \frac{\Delta V_{ER}}{\tan\theta}\right)\right]$$

$$\Delta V_N(S_{D+}) = \left[\frac{1}{2(\tan\alpha_1 + \tan\alpha_2)}\right]\left[\frac{\Delta V_{DT} - \Delta V_{ET}}{\tan\theta} + \tan\alpha_2\left(\Delta V_{IN} + \frac{\Delta V_{ER}}{\tan\theta}\right)\right]$$

-continued $$\Delta V_N(S_{D-}) \doteq \left[\frac{1}{2(\tan\alpha_1 + \tan\alpha_2)}\right]\left[-\left(\frac{\Delta V_{DT} - \Delta V_{ET}}{\tan\theta}\right) + \tan\alpha_1\left(\Delta V_{IN} + \frac{\Delta V_{ER}}{\tan\theta}\right)\right]$$

where:
$\Delta V_{DT}$=Required total tangential $\Delta V$ to control longitude mean motion.
$\Delta V_{ET}$=Required total tangential $\Delta V$ to control orbit eccentricity component along an axis connecting R.A.$\approx$90° and R.A.$\approx$270°.
$\Delta V_{ER}$=Required total radial $\Delta V$ to control orbit eccentricity component along an axis perpendicular to an axis connecting R.A.$\approx$90° and R.A.$\approx$270°.
$\Delta V_{IN}$=Required total normal $\Delta V$ to control orbit inclination.

The thruster firing time duration $T_p$ is given by:

$$T_p = \frac{2}{\omega_e}\sin^{-1}\left[\frac{\omega_e}{2}\left(\frac{m\Delta V_N}{F\cos\theta}\right)\right]$$

$\omega_e$=earth rate, m=spacecraft mass, F=engine thrust and $\Delta V_N$ has four values corresponding to each of the four thruster ($N_{A+}$, $N_{A-}$, $S_{D+}$, $S_{D-}$) as specified by the equations above. The burn time per thruster (for a 17.7 millinewton thrust level) will average about one hour per day for normal operation.

Figure 5:
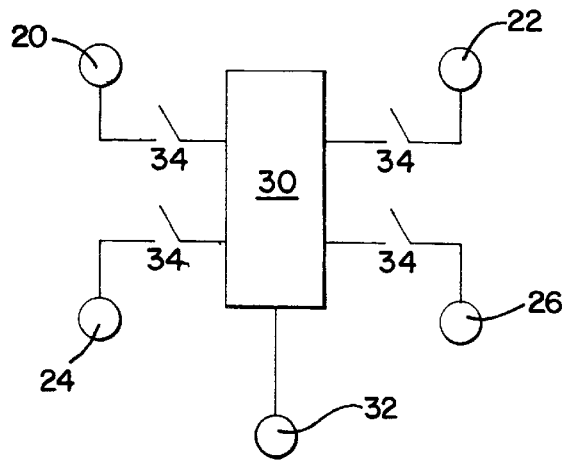
FIG. 5 schematically shows a control system to achieve stationkeeping according to the present invention.

Operation of the satellite 10 is schematically shown in FIG. 5. The satellite 10 preferably has a control element, such as a microprocessor 30, that is electrically connected to each thruster 20, 22, 24 and 26. The control element 30 is also in contact with signals from a monitor 32 that monitors the pitch angle of the satellite 10. Monitor 32 may be an on-board gyroscope or an antenna that receives telemetry information from a groundstation on Earth. Based on the magnitude of the monitored pitch angle, the control element calculates the values of $\Delta V$ and burn durations as described above. The control element then generates control signals that (1) fire the northeast thruster 22 and the northwest thruster 20 near an orbit ascending node, and (2) fire the southeast thruster 26 and the southwest thruster 24 near an orbit descending node in accordance with the calculated values of $\Delta V$ and the burn durations.

The tangential $\Delta V$ imbalance produced by the pitch rotation generally requires larger slew angles to accommodate the east-west orbit control requirements when the satellite is in the nominal mode of operation, i.e., when all four thrusters are operating. If a larger slew design is acceptable, then no additional propellant is required for the four thrusters due to the pitch rotation. However, should one or both of a diagonal pair of thrusters fail, the other diagonal pair of thrusters can maintain complete orbital control in a manner similar to that described in the '231 Anzel patent. The control element generates signals that direct the enabled diagonal thruster pair to fire at positions A and B to provide complete control of inclination and mean motion; however, the eccentricity will be incorrect. A third firing is performed at R.A.$\approx$0° or R.A.$\approx$180°, depending on which diagonal pair is active. In particular, the third burn R.A. will be located at an angle approximately equal to:

$$\frac{\pi}{2} + \text{ARCTAN}\left[\frac{V_s\delta e_{h_1}}{V_s\delta e_{k_1}}\right]$$

where
$\delta e_{h_1}$=error eccentricity component along axis connecting R.A.$\approx\pi/2$ and R.A.$\approx 3\pi/2$ resulting from firings at positions A and B;
$\delta e_{k_1}$=error eccentricity component along axis orthogonal to axis connecting R.A.$\approx\pi/2$ and R.A.$\approx 3\pi/2$ resulting from firings at positions A and B; and
$V_s$=satellite velocity magnitude in synchronous orbit.

At the third firing, both thrusters are fired with unequal $\Delta V$'s, resulting in tangential component $\Delta V$ cancellation. Note that as the tangential component is canceled, a residual normal $\Delta V$ component is now present. The radial components will be additive and will provide the necessary eccentricity control. The time of firing and burn duration are chosen to nullify both the incorrect eccentricity produced by the nodal firings in addition to that produced by solar force. The value of the residual normal $\Delta V$ component is known and, therefore, the firings of A and B can be recalculated to nullify this residual normal $\Delta V$ component.

Thus, upon failure of any one of the thrusters 20–26, the corresponding diagonal thruster would be shut down and the firing procedure outlined above would be followed by the control element. Shut down can be accomplished by opening a switch 34 that is in electrical contact with a thruster. There are two cases, either a) thruster 20 ($N_{A+}$) and thruster 26 ($S_{D-}$) are used, or b) thruster 22 ($N_{A-}$) and thruster 24 ($S_{D+}$) are used. The location along the orbit of the burn arcs are illustrated in FIGS. 4A and 4B. There are three burn arcs per orbit. Since the burns at the nodal crossing (R.A.$\approx$90° and R.A.$\approx$270°) are performed by single thrusters in the failure case, they will each required about twice the burn time as for the nominal case.

One drawback of the satellite 10 performing a pitch rotation is that the fuel consumptions of the satellite 10 will increase when compared with the situation where the satellite 10 does not perform a pitch rotation, such as described in the '231 Anzel patent. In fact, the consumption of fuel increases non-linearly with the magnitude of the pitch angle $\rho$.

There are several ways to counteract the increased fuel consumption. First, if the pitch offset requirements are known a priori, an asymmetrical mounting of the four thrusters can overcome the problem. In this scenario, the thrusters would be laterally shifted along the anti-nadir face in the required direction in order to provide virtual negation of the adverse effect that pitch rotation causes regarding fuel consumption. Once shifted, the thrusters would be permanently mounted in the desired configuration prior to being launched with the satellite 10.

Figure 6:
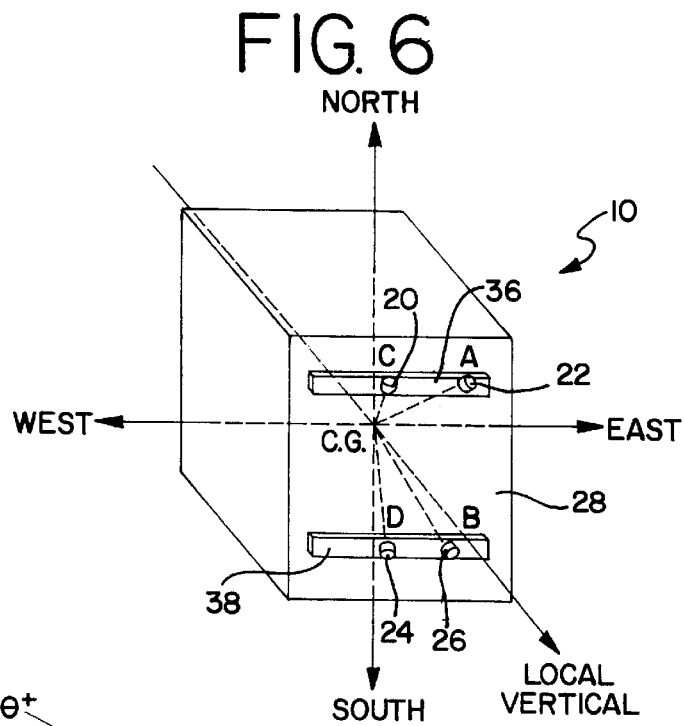
FIG. 6 shows a mechanism for moving the thrusters of FIG. 3.

If the pitch offset requirements are not known prior to launch, each thruster can be attached to a movement mechanism that can slide the thruster to a position on the anti-nadir face in response to the amount that the satellite 10 is pitched. An example of such a movement mechanism is the slide mechanism(s) disclosed in U.S. Pat. No. 5,020,746, whose entire contents are incorporated herein by reference. A pair of sliding mechanisms 36 and 38 are shown in FIG. 6 which control the translation of the north and south pairs of thrusters 20, 22 and 24, 26, respectively. The slide mechanisms 34 and 36 are mounted to the anti-nadir face 28 of the satellite 10 and may be implemented by rail and servo mechanisms or other components without departing from the scope of the present invention. The slide mechanisms 34 and 36 allow either the northern or southern thruster pair to be moved in an east-west direction along the satellite 10 from first positions A and B respectively to second positions C and D respectively such that the lines of force from the thrusters are maintained through the center of gravity of the satellite 10. Those skilled in the art will recognize that the slide mechanisms 34 and 36 can be configured to move the thrusters independability of each other. Furthermore, the slide mechanisms 34 and 36 may be controlled by commands from a ground based station or automatically by control element on the satellite 10 in response to changes in the pitch angle ρ where the amount of movement is related to the magnitude of ρ. This allows the four thrusters to be translated to the east or west in response to a real time change in the effective slew angles, where the gimbaling would permit redirecting the thrust lines through the center of mass. Furthermore, this would allow changing the pitch offset angles at any time during the life of the satellite depending on the circumstances or customer requirements.

In summary, the present invention regards a control system for controlling the orbit of a spacecraft. The control system of the present invention controls the orbital motion of a spacecraft which is rotated about a pitch axis. This leads to more flexibility in pointing the spacecraft and improved fuel efficiency on the spacecraft. The improved fuel efficiency may allow the spacecraft to perform stationkeeping solely via ion propulsion thrusters and, thus, reduce the need for bipropellant fuel or thrusters.

The foregoing description is provided to illustrate the invention, and is not to be construed as a limitation. Numerous additions, substitutions and other changes can be made to the invention without departing from its scope as set forth in the appended claims.

I claim:

1. A method of stationkeeping for a three-axis stabilized satellite having four thrusters mounted in a generally rectangular configuration on an anti-nadir face of the satellite, each of the four thrusters having a line of thrust which passes through the center of mass of the satellite, the four thrusters including a northwest thruster, a northeast thruster, a southwest thruster, and a southeast thruster, the method comprising the steps of:

rotating said satellite about a pitch axis that is perpendicular to a normal to said anti-nadir face of the satellite;

canting the northwest thruster and the northeast thruster away from the anti-nadir face in a north direction with respect to a north-south axis which passes through the center of mass of the satellite;

canting the southwest thruster and the southeast thruster away from the anti-nadir face in a south direction with respect to the north-south axis;

slewing the northeast thruster and the southeast thruster in an east direction about the north-south axis;

slewing the northwest thruster and the southwest thruster in an west direction about the north-south axis;

firing the northeast thruster and the northwest thruster near an orbit ascending node;

firing the southeast thruster and the southwest thruster near an orbit descending node; and wherein each of the four thrusters is fired in accordance with the amount that the satellite is rotated about the pitch axis.

2. The method of claim 1, wherein firing time durations for each thruster is dependent upon a first predetermined quantity representative of a required change in tangential velocity to control longitude mean motion and a second predetermined quantity representative of a required change in tangential velocity to control an orbit eccentricity component along a first axis which connects the ascending node and the descending node and wherein the four thrusters are slewed to provide effective control of the orbit eccentricity component.

3. The method of claim 1 wherein the northwest thruster is fired before the orbit ascending node and the northeast thruster is fired after the orbit ascending node.

4. The method of claim 1 wherein the southwest thruster is fired before the orbit descending node and the southeast thruster is fired after the orbit descending node.

5. The method of claim 1 wherein the northwest thruster and the northeast thruster are canted away from the anti-nadir face by a predetermined angle θ with respect to the north-south axis, and wherein the southwest thruster and the southeast thruster are canted away from the anti-nadir face by the predetermined angle θ with respect to the north-south axis.

6. The method of claim 1 wherein the northwest thruster and the southwest thrusters are slewed about the north-south axis by a predetermined angle $\alpha_1$, and wherein the northeast thruster and the southeast thrusters are slewed about the north-south axis by the predetermined angle $\alpha_2$.

7. The method of claim 6 wherein $\alpha_1$ and $\alpha_2$, are related to the pitch angle ρ and the unpitched slew angle α by the relationships:

$\alpha_1 = \alpha + \rho$; and $\alpha_2 = \alpha - \rho$.

8. The method of claim 7 wherein α is at least 10 degrees.

9. The method of claim 1 wherein each of the four firing time durations is further dependent upon a third predetermined quantity representative of a required change in radial velocity to control an orbit eccentricity component along a second axis perpendicular to the first axis, and a fourth quantity representative of a required change in normal velocity to control orbit inclination.

10. The method of claim 5 wherein the four thrusters are canted away from the anti-nadir face by a predetermined angle θ with respect to the north-south axis, and each of the four firing time durations is based upon a corresponding one of four change in velocity quantities, the four change in velocity quantities for $V_N$ for the northwest, northeast, southwest and southeast thrusters, respectively, are given by:

$$\Delta V_N(N_{A+}) \doteq \left[ \frac{1}{2(\tan\alpha_1 + \tan\alpha_2)} \right] \left[ \frac{\Delta V_{DT} + \Delta V_{ET}}{\tan\theta} + \tan\alpha_2 \left( \Delta V_{IN} - \frac{\Delta V_{ER}}{\tan\theta} \right) \right]$$

$$\Delta V_N(N_{A-}) \doteq \left[ \frac{1}{2(\tan\alpha_1 + \tan\alpha_2)} \right] \left[ -\left( \frac{\Delta V_{DT} + \Delta V_{ET}}{\tan\theta} \right) + \tan\alpha_1 \left( \Delta V_{IN} - \frac{\Delta V_{ER}}{\tan\theta} \right) \right]$$

$$\Delta V_N(S_{D+}) \doteq \left[ \frac{1}{2(\tan\alpha_1 + \tan\alpha_2)} \right] \left[ \frac{\Delta V_{DT} - \Delta V_{ET}}{\tan\theta} + \tan\alpha_2 \left( \Delta V_{IN} + \frac{\Delta V_{ER}}{\tan\theta} \right) \right]$$

-continued
$$\Delta V_N(S_{D-}) \doteq \left[ \frac{1}{2(\tan\alpha_1 + \tan\alpha_2)} \right] \left[ -\left( \frac{\Delta V_{DT} - \Delta V_{ET}}{\tan\theta} \right) + \tan\alpha_1 \left( \Delta V_{IN} + \frac{\Delta V_{ER}}{\tan\theta} \right) \right]$$

where:
- $\Delta V_{DT}$=Required total tangential $\Delta V$ to control longitude mean motion;
- $\Delta V_{ET}$=Required total tangential $\Delta V$ to control orbit eccentricity component along an axis connecting R.A.$\approx$90° and R.A.$\approx$270°;
- $\Delta V_{ER}$=Required total radial $\Delta V$ to control orbit eccentricity component along an axis perpendicular to an axis connecting R.A.$\approx$90° and R.A.$\approx$270°; and
- $\Delta V_{IN}$=Required total normal $\Delta V$ to control orbit inclination.

11. A stationkeeping system for a three-axis stabilized satellite, the system comprising:
- four thrusters mounted in a generally rectangular configuration on an anti-nadir face of the satellite, each of the four thrusters having a line of thrust which passes through the center of mass of the satellite, the four thrusters including a northwest thruster, a northeast thruster, a southwest thruster, and a southeast thruster; the northwest thruster and the northeast thruster being canted away from the anti-nadir face in a north direction with respect to a north-south axis which passes through the center of mass of the satellite; the southwest thruster and the southeast thruster being canted away from the anti-nadir face in a south direction with respect to the north-south axis; the northeast thruster and the southeast thruster being slewed in an east direction about the north-south axis; the northwest thruster and the southwest thruster being stewed in an west direction about the north-south axis;
- a control element connected to each of said four thrusters, wherein said control element monitors the pitch angle of said satellite and generates control signals that (1) fire the northeast thruster and the northwest thruster near an orbit ascending node, and (2) fire the southeast thruster and the southwest thruster near an orbit descending node, each of the four thrusters being fired in accordance with the pitch angle of said satellite.

12. The stationkeeping system of claim 11 wherein a firing time duration for each thruster is dependent upon a first predetermined quantity representative of a required change in tangential velocity to control an orbit eccentricity component along a first axis which connects the ascending node and the descending node, and wherein the four thrusters are slewed to provide effective control of the orbit eccentricity component.

13. The system of claim 11 wherein the northwest thruster is fired before the orbit ascending node and the northeast thruster is fired after the orbit ascending node.

14. The system of claim 11 wherein the southwest thruster is fired before the orbit descending node and the southeast thruster is fired after the orbit descending node.

15. The system of claim 11 wherein the northwest thruster and the northeast thruster are canted away from the anti-nadir face by a predetermined angle $\theta$ with respect to the north-south axis, and wherein the southwest thruster and the southeast thruster are canted away from the anti-nadir face by the predetermined angle $\theta$ with respect to the north-south axis.

16. The method of claim 11 wherein the northwest thruster and the southwest thrusters are slewed about the north-south axis by a predetermined angle $\alpha_1$, and wherein the northeast thruster and the southeast thrusters are slewed about the north-south axis by the predetermined angle $\alpha_2$.

17. The method of claim 16 wherein $\alpha_1$ and $\alpha_2$ are related to the pitch angle $\rho$ and the unpitched slew angle $\alpha$ by the relationships:

$\alpha_1 = \alpha + \rho$; and $\alpha_2 = \alpha - \rho$.

18. The method of claim 17 wherein $\alpha$ is at least 10 degrees.

19. The system of claim 11 wherein each of the four firing time durations is further dependent upon a third predetermined quantity representative of a required change in radial velocity to control an orbit eccentricity component along a second axis perpendicular to the first axis, and a fourth quantity representative of a required change in normal velocity to control orbit inclination.

20. The system of claim 16 wherein the four thrusters are canted away from the anti-nadir face by a predetermined angle $\theta$ with respect to the north-south axis, and each of the four firing time durations is based upon a corresponding one of four change in velocity quantities, the four change in velocity quantities for the northwest, northeast, southwest and southeast thrusters, respectively, are given by:

$$\Delta V_N(N_{A+}) \doteq \left[ \frac{1}{2(\tan\alpha_1 + \tan\alpha_2)} \right] \left[ \frac{\Delta V_{DT} + \Delta V_{ET}}{\tan\theta} + \tan\alpha_2 \left( \Delta V_{IN} - \frac{\Delta V_{ER}}{\tan\theta} \right) \right]$$

$$\Delta V_N(N_{A-}) \doteq \left[ \frac{1}{2(\tan\alpha_1 + \tan\alpha_2)} \right] \left[ -\left( \frac{\Delta V_{DT} + \Delta V_{ET}}{\tan\theta} \right) + \tan\alpha_1 \left( \Delta V_{IN} - \frac{\Delta V_{ER}}{\tan\theta} \right) \right]$$

$$\Delta V_N(S_{D+}) \doteq \left[ \frac{1}{2(\tan\alpha_1 + \tan\alpha_2)} \right] \left[ \frac{\Delta V_{DT} - \Delta V_{ET}}{\tan\theta} + \tan\alpha_2 \left( \Delta V_{IN} + \frac{\Delta V_{ER}}{\tan\theta} \right) \right]$$

$$\Delta V_N(S_{D-}) \doteq \left[ \frac{1}{2(\tan\alpha_1 + \tan\alpha_2)} \right] \left[ -\left( \frac{\Delta V_{DT} - \Delta V_{ET}}{\tan\theta} \right) + \tan\alpha_1 \left( \Delta V_{IN} + \frac{\Delta V_{ER}}{\tan\theta} \right) \right]$$

where:
- $\Delta V_{DT}$=Required total tangential $\Delta V$ to control longitude mean motion;
- $\Delta V_{ET}$=Required total tangential $\Delta V$ to control orbit eccentricity component along an axis connecting an axis connecting R.A.$\approx$90° and R.A.$\approx$270°;
- $\Delta V_{ER}$=Required total radial $\Delta V$ to control orbit eccentricity component along an axis perpendicular to an axis connecting R.A.$\approx$90° and R.A.$\approx$270°; and
- $\Delta V_{IN}$=Required total normal $\Delta V$ to control orbit inclination.

21. A method of station keeping for a three-axis stabilized satellite in response to a failure of a first thruster of four thrusters, the four thrusters mounted in a generally rectangular configuration on an anti-nadir face of the satellite, each of the four thrusters having a line of thrust which passes through the center of mass of the satellite and is canted away from the anti-nadir face, the four thrusters including a north pair and a south pair, the method of comprising the steps of:

monitoring the amount that the satellite is rotated with respect to a pitch axis that is perpendicular to a normal to said anti-nadir face of the satellite;

shutting down a second thruster of the four thrusters, the second thruster located diagonally with respect to the first thruster;

firing a remaining north thruster of the north pair near an orbit ascending node;

firing a remaining south thruster of the south pair near an orbit descending node simultaneously firing the remaining north thruster and the remaining south thruster between the orbit ascending node and the orbit descending node, wherein the remaining north thruster and the remaining south thruster are simultaneously fired to control an orbit eccentricity component without substantially affecting a tangential velocity component;

wherein the velocity produced by each thruster and the duration of each firing is dependent on the monitored amount that the satellite is rotated with respect to the pitch axis.

22. The method of claim 21 wherein the orbit ascending node has approximately a 90-degree right ascension angle, the orbit descending node has approximately a 270-degree right ascension angle, the remaining north thruster is an eastern one of the north pair, the remaining south thruster is a western one of the south pair, and the simultaneous firing occurs at a right ascension angle approximately of 0 degrees.

23. The method of claim 21 wherein the orbit ascending node has approximately a 90-degree right ascension angle, the orbit descending node has approximately a 270-degree right ascension angle, the remaining north thruster is an western one of the north pair, the remaining south thruster is a eastern one of the south pair, and the simultaneous firing occurs at a right ascension angle of approximately 180 degrees.

24. The method of claim 21 wherein the remaining north thruster and the remaining south thruster are simultaneously fired at a time and duration dependent upon an eccentricity produced by a solar force and the steps of firing at the orbit ascending node and the orbit descending node.

25. The method of claim 21, comprising the step of translationally moving at least one of said four thrusters along said anti-nadir face of the satellite by an amount that is dependent to the monitored amount that the satellite is rotated with respect to a pitch axis.

26. The method of claim 25, wherein a pair of thrusters are translationally moved along said anti-nadir face of the satellite by an amount that is dependent to the monitored amount that the satellite is rotated with respect to a pitch axis.

* * * * *